United States Patent
Espino

(10) Patent No.: US 7,783,593 B2
(45) Date of Patent: Aug. 24, 2010

(54) METHOD, DEVICE AND COMPUTER PROGRAM PRODUCT INCLUDING A LIGHTWEIGHT DIRECTORY ACCESS PROTOCOL CLIENT

(75) Inventor: Mayel Espino, Colorado Springs, CO (US)

(73) Assignee: Verizon Business Global LLC, Basking Ridge, NJ (US)

(*) Notice: Subject to any disclaimer, the term of this patent is extended or adjusted under 35 U.S.C. 154(b) by 358 days.

(21) Appl. No.: 10/114,939

(22) Filed: Apr. 4, 2002

(65) Prior Publication Data

US 2003/0191747 A1 Oct. 9, 2003

(51) Int. Cl.
G06F 7/00 (2006.01)
G06F 17/00 (2006.01)
G06F 17/30 (2006.01)
G06F 15/16 (2006.01)
G06F 9/44 (2006.01)
H04M 3/42 (2006.01)
G06F 15/173 (2006.01)
H04L 29/06 (2006.01)

(52) U.S. Cl. ............... 707/609; 707/722; 707/769; 709/203; 709/219; 709/223; 713/153; 717/172; 379/201.05

(58) Field of Classification Search ............... 717/172; 707/3, 10, 102, 200; 709/223, 203, 219; 713/153; 379/201.05
See application file for complete search history.

(56) References Cited

U.S. PATENT DOCUMENTS

| | | | | |
|---|---|---|---|---|
| 5,881,144 A | * | 3/1999 | Havens | 379/201.05 |
| 5,974,454 A | * | 10/1999 | Apfel et al. | 709/221 |
| 6,035,423 A | * | 3/2000 | Hodges et al. | 714/38 |
| 6,041,346 A | * | 3/2000 | Chen et al. | 709/218 |
| 6,098,099 A | * | 8/2000 | Ellesson et al. | 709/223 |
| 6,269,369 B1 | * | 7/2001 | Robertson | 707/10 |
| 6,477,543 B1 | * | 11/2002 | Huang et al. | 707/200 |
| 6,490,619 B1 | * | 12/2002 | Byrne et al. | 709/223 |
| 6,708,170 B1 | * | 3/2004 | Byrne et al. | 707/9 |
| 6,732,160 B2 | * | 5/2004 | Ambrosini et al. | 709/218 |
| 7,016,976 B2 | * | 3/2006 | Merrells et al. | 709/245 |
| 2001/0034733 A1 | * | 10/2001 | Prompt et al. | 707/102 |
| 2002/0010760 A1 | * | 1/2002 | Armenta et al. | 709/219 |
| 2002/0191619 A1 | * | 12/2002 | Shafer | 370/401 |
| 2002/0199116 A1 | * | 12/2002 | Hoene et al. | 713/201 |
| 2003/0212686 A1 | * | 11/2003 | Chu-Carroll et al. | 707/100 |
| 2005/0169476 A1 | * | 8/2005 | Little et al. | 380/255 |

* cited by examiner

Primary Examiner—James Trujillo
Assistant Examiner—Cheryl M Shechtman

(57) ABSTRACT

A method, apparatus and computer program product for updating data for an application, including invoking a client application; identifying an application having data to be updated; and sending a query to a directory server via the client application, the query identifying the data.

21 Claims, 6 Drawing Sheets

US 7,783,593 B2

METHOD, DEVICE AND COMPUTER PROGRAM PRODUCT INCLUDING A LIGHTWEIGHT DIRECTORY ACCESS PROTOCOL CLIENT

CROSS REFERENCE TO RELATED CASES

The present invention is related to the following commonly owned co-pending United States Patent Applications of Espino filed herewith entitled: (1) "LIGHTWEIGHT DIRECTORY ACCESS PROTOCOL METHOD, SYSTEM AND COMPUTER PROGRAM PRODUCT," Ser. No. 10/115,254, (2) "METHOD, DEVICE AND COMPUTER PROGRAM PRODUCT INCLUDING A LIGHTWEIGHT DIRECTORY ACCESS PROTOCOL CLIENT ARCHITECTURE," Ser. No. 10/115,251, (3) "METHOD, SYSTEM AND COMPUTER PROGRAM PRODUCT FOR A LIGHTWEIGHT DIRECTORY ACCESS PROTOCOL CLIENT APPLICATION PROGRAM INTERFACE," Ser. No. 10/115,255, and (4) "METHOD, SYSTEM AND COMPUTER PROGRAM PRODUCT FOR LIGHTWEIGHT DIRECTORY ACCESS PROTOCOL APPLICATIONS," Ser. No. 10/115,258, the entire contents of all of which are incorporated herein by reference.

BACKGROUND OF THE INVENTION

1. Field of the Invention

The present invention relates to the lightweight directory access protocol and more particularly to a method, device and computer program product including a lightweight directory access protocol client.

2. Discussion of the Background

In recent years, hand-held devices, such as personal digital assistants (PDAs), palmtop computers, cell phones, etc., have gained widespread use for performing non-standard functions, such as e-mail functions, Web browser functions, stock quote functions, weather reporting functions, news reporting functions, graphical display functions, audio and video streaming functions, etc. In such hand-held devices, however, memory and processing power are at a premium due the small size of such devices. Nonetheless, such devices typically use HTML/HTTP for performing such functions, even though HTML/HTTP may not be very well suited for such applications in view of the memory and processing power constraints of such devices.

For example, in implementing a web browser function, numerous instructions are typically used to render a single HTML document, which consumes precious memory and processor resources. In addition, a web browser function typically uses cache to store the HTML source code and any included images, further consuming memory and processor resources. Part of the problem stems from the fact that most Web pages include numerous graphics and are designed for viewing on personal and laptop computers, which typically have sufficient memory and processor resources, as compared to hand-held devices. Even if a text-only browser may be employed, it may be still difficult to navigate most Web pages because of their inherent graphical design.

Therefore, there is a need for a system and device that provides non-standard functions, such as e-mail functions, Web browser functions, stock quote functions, weather reporting functions, news reporting functions, graphical display functions, audio and video streaming functions, etc., but consumes less memory and processor resources than conventional systems and hand-held devices.

SUMMARY OF THE INVENTION

The above and other needs are addressed by the present invention, which provides an improved method, device and computer program product for a lightweight directory access protocol (LDAP) client included in a device, such as a hand-held device. The device may then provide functions, such as e-mail functions, Web browser functions, stock quote functions, weather reporting functions, news reporting functions, graphical display functions, audio and video streaming functions, etc., while consuming less memory and processor resources than conventional hand-held devices.

Accordingly, in one aspect of the present invention there is provided a method, apparatus and computer program product for updating data for an application, including invoking a client application; identifying an application having data to be updated; and sending a query to a directory server via the client application, the query identifying the data.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details may be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
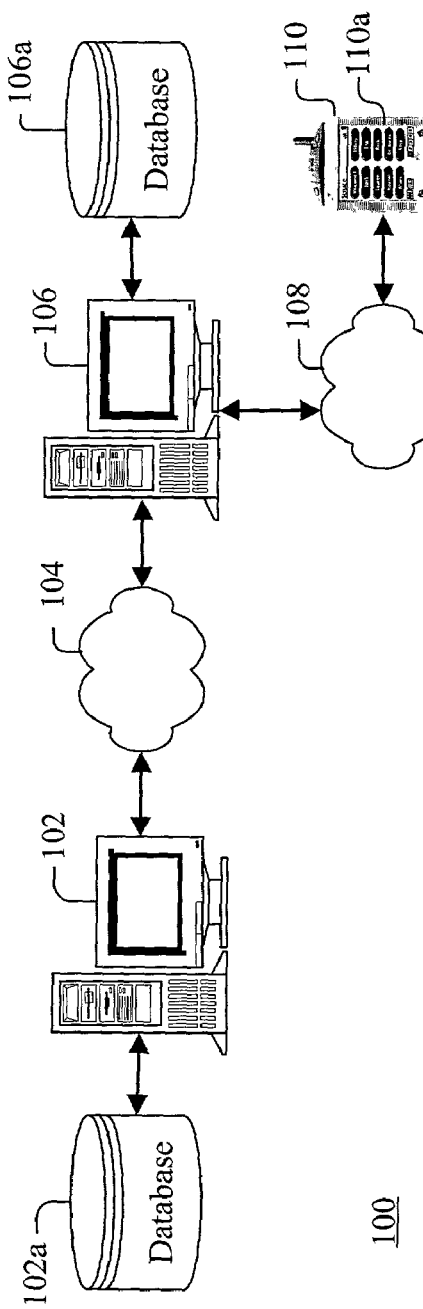
FIG. 1 is a block diagram illustrating a lightweight directory access protocol (LDAP) system.

A method, device and computer program product for a lightweight directory access protocol (LDAP) client, are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, wellknown structures and devices are shown in block diagram form in order to avoid unnecessarily obscuring the present invention.

The present invention includes numerous advantages over conventional HTML/HTTP-based systems and methods typically used in hand-held devices. In this respect, the present invention includes recognition that HTML/HTTP may be bloated when compared to lightweight directory access protocol (LDAP, e.g., as taught in "Implementing LDAP," by Mark Wilcox, March 1999, the entire contents of which are incorporated herein by reference). Accordingly, a HTML/HTTP Web browser function typically needs more instructions to render an HTML document than a thin LDAP client according to the present invention uses to process and reply to a query and perform a similar function.

In addition, a Web browser function using HTML/HTTP would typically need cache to store the HTML and perhaps images, whereas a thin LDAP client according to the present invention typically employs only the space needed to store query results and the space to store the query results may be configured. Further, for the types of services and applications that the present invention suggests (e.g., as described in commonly owned co-pending United States Patent Application filed herewith, entitled "METHOD, SYSTEM AND COMPUTER PROGRAM PRODUCT FOR LIGHTWEIGHT DIRECTORY ACCESS PROTOCOL APPLICATIONS," Ser. No. 10/115,258), there may be typically no need for intensive graphics nor an exuberant layout. Moreover, LDAP results in less network traffic than HTML/HTTP because in HTML/HTTP each request constitutes a new session or connection, whereas with LDAP functions that would employ multiple HTML/HTTP requests may be accomplished via a single LDAP query.

In the above respect, a thin LDAP client may be ideally suited for hand-held devices because such implementation addresses the previously noted problems with conventional HTTP/HTML-based hand-held devices. In this respect, LDAP may retrieve information with less network overhead than HTTP/HTML. The LDAP client maximizes the amount of information retrieved in a transaction by using a single query, rather than multiple queries. The LDAP client may be a small program compared to conventional HTTP/HTML-based clients. The less space taken up by the LDAP client program the more space that may be available for storing information and other applications. The LDAP client typically does not need to store and process HTML tags. A directory service or back end server for servicing a device including the LDAP client may be based on a subscription service paid monthly, a service included as part of an Internet subscription, etc.

The following exemplary scenarios illustrate a typical LDAP client-based transaction versus a typical HTTP/HTML client-based transaction. In an LDAP client-based transaction: (i) the LDAP client establishes a connection to a back end server (e.g., including a LDAP directory server, etc.), (ii) the LDAP client makes a single LDAP request, (iii) the back end server sends all the information that the LDAP client may handle in a single transmission, (iv) the LDAP client processes predefined attributes stored as part of an application or program, and (v) the application presents the information to a user of the LDAP client-based device.

Because the LDAP may include a query language, the LDAP client may create a LDAP query string based on the applications that are installed on the LDAP client-based device. Via the query string, the applications may have their information updated (e.g., updated sports scores for a sports-related application, updates stock quotes for a stock quote-related application, updated e-mail messages for an e-mail-related application, updated addresses for a contact management-related application, etc.).

The query string may be a text in the LDAP language that may be transmitted from the LDAP client-based device (e.g., via a modem device, etc.) to the back end server. The back end server may return a query result based on the query string received from the LDAP client-based device. Thus, advantageously, with a single LDAP query from the LDAP client-based device (as opposed to multiple transactions with the HTML-based device), the back end server may be informed of what information may be requested for update by the applications of the LDAP client-based device.

In contrast, in a HTTP/HTML client-based transaction: (i) the HTTP/HTML client establishes a connection to a Web server, (ii) the HTTP/HTML client makes a HTML request, (iii) the Web server sends a HTML main page, (iv) the HTTP/HTML client retrieves additional HTML elements, such as images, etc., one transmission per item, (v) the HTTP/HTML client processes tags stored in memory and (vi) the HTTP/HTML client presents the information to a user the HTTP/HTML-based device. As shown by the above exemplary scenarios the LDAP client-based transaction may be more efficient, uses less memory and processor resources and maximizes use of a network and bandwidth as compared to the conventional HTTP/HTML client-based transaction.

Accordingly, the LDAP client pulls the information for an associated application in a single query, minimizing transaction time. An HTTP/HTML client, on the other hand, generates multiple requests to load all of the elements of an HTML page. The LDAP client loads information received from the back end server into a database. When the user selects an application, the application uses the information in the database directly, resulting in quick and efficient application processing. An HTTP/HTML client, on the other hand, may be more resource intensive because it includes software that process the tags, applets, scripts, and other HTML components included in the HTML page(s) sent in response to the HTTP/HTML request.

Referring now to the drawings, wherein like reference numerals designate identical or corresponding parts throughout the several views, and more particularly to FIG. 1 thereof, there is illustrated a block diagram of a LDAP system 100, according to the present invention. In FIG. 1, the system 100 includes content server 102 and corresponding database 102a, back end server 106 and corresponding database 106a and a device 110, such as a hand-held device, a personal digital assistant (PDA), a cellular phone, an Internet appliance, a palmtop computer, etc. The content server 102 may be coupled to the back end server 106 via communications network 104. The back end server 106 may be coupled to the device 110 via communications network 108. The device 110 includes a LDAP client and a display screen 110a for displaying and running one or more applications.

Figure 3:
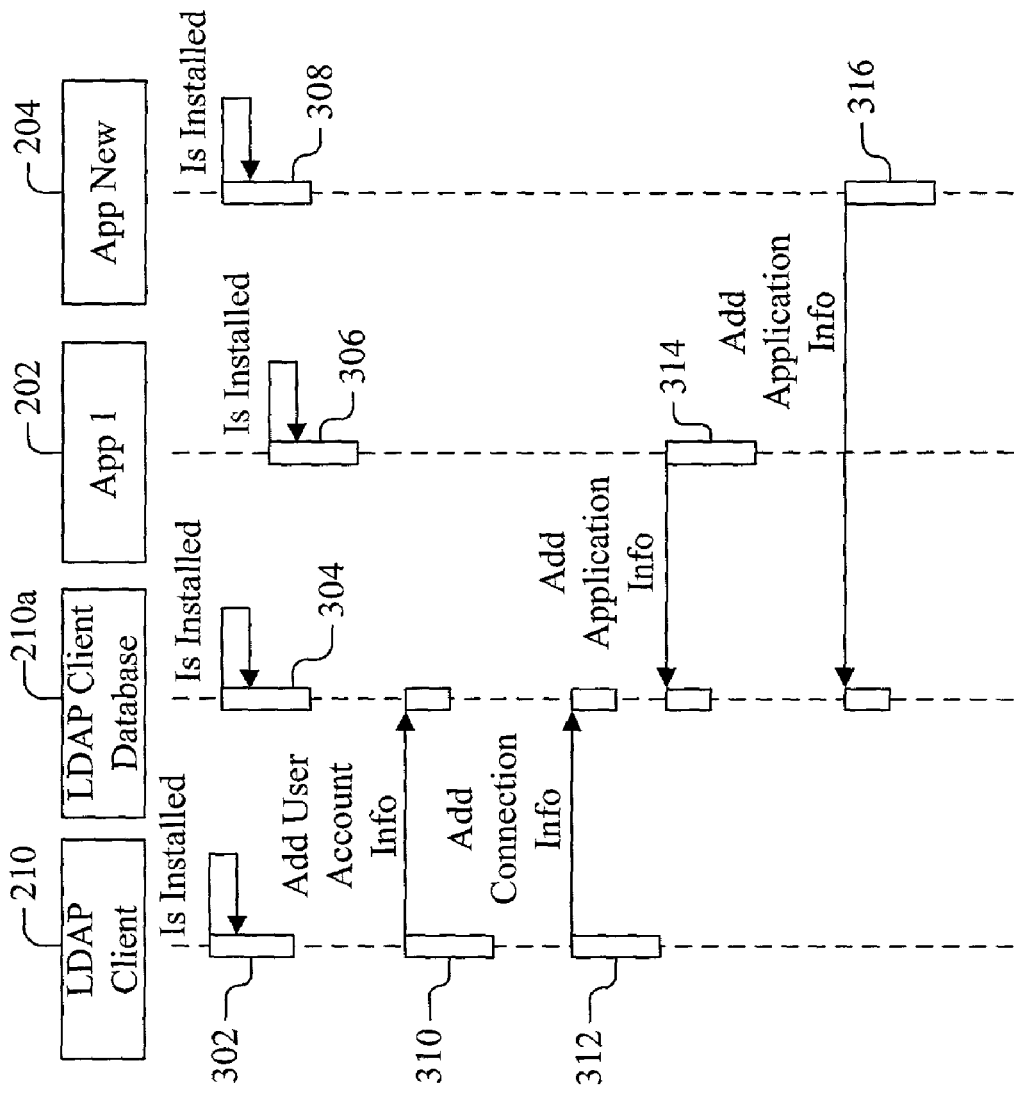
FIG. 3 is a sequence diagram illustrating an exemplary installation scenario for applications on the device of the system of FIG. 1.
Figure 4:
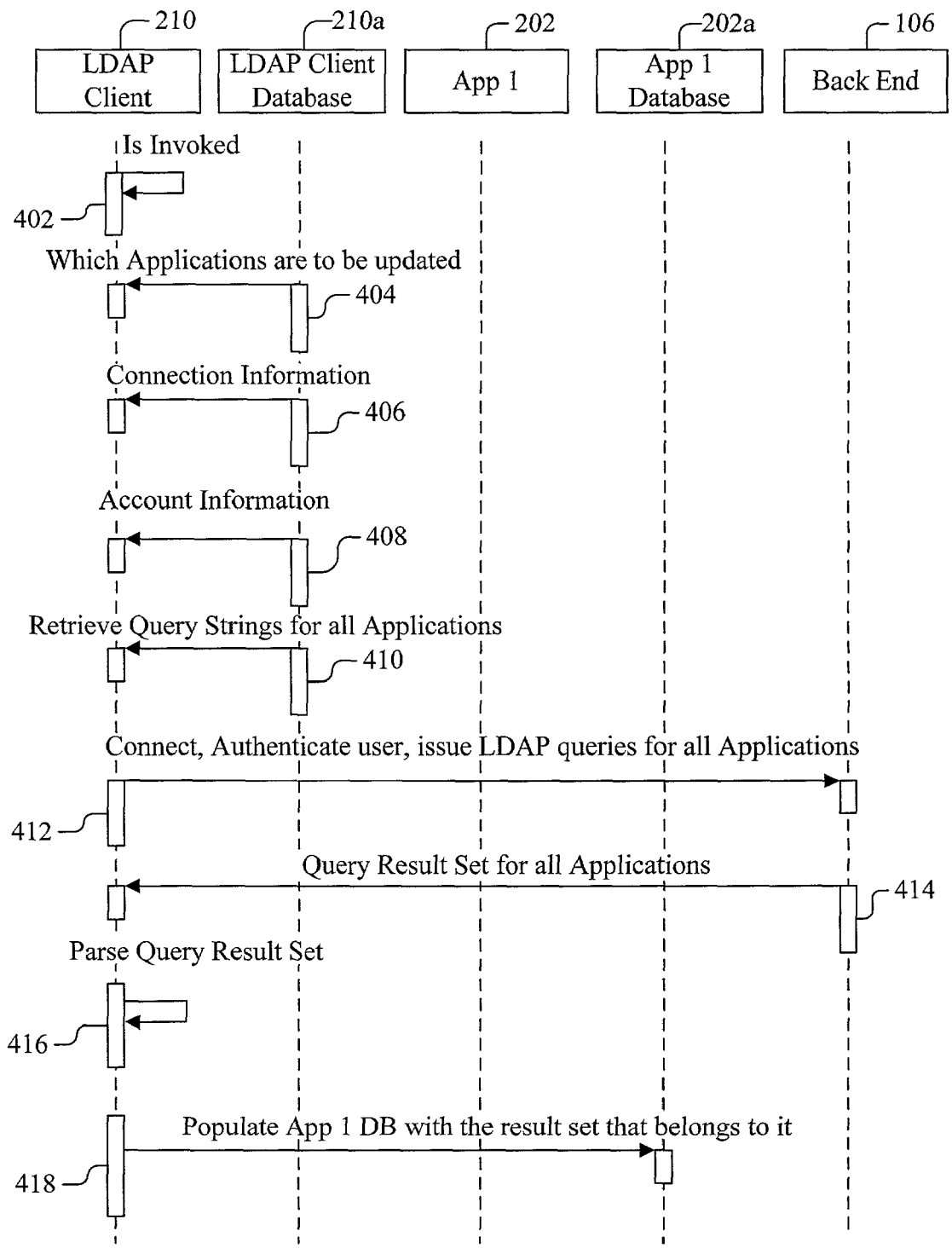
FIG. 4 is a sequence diagram illustrating an exemplary first use scenario of an application of the device of the system of FIG. 1.
Figure 5:
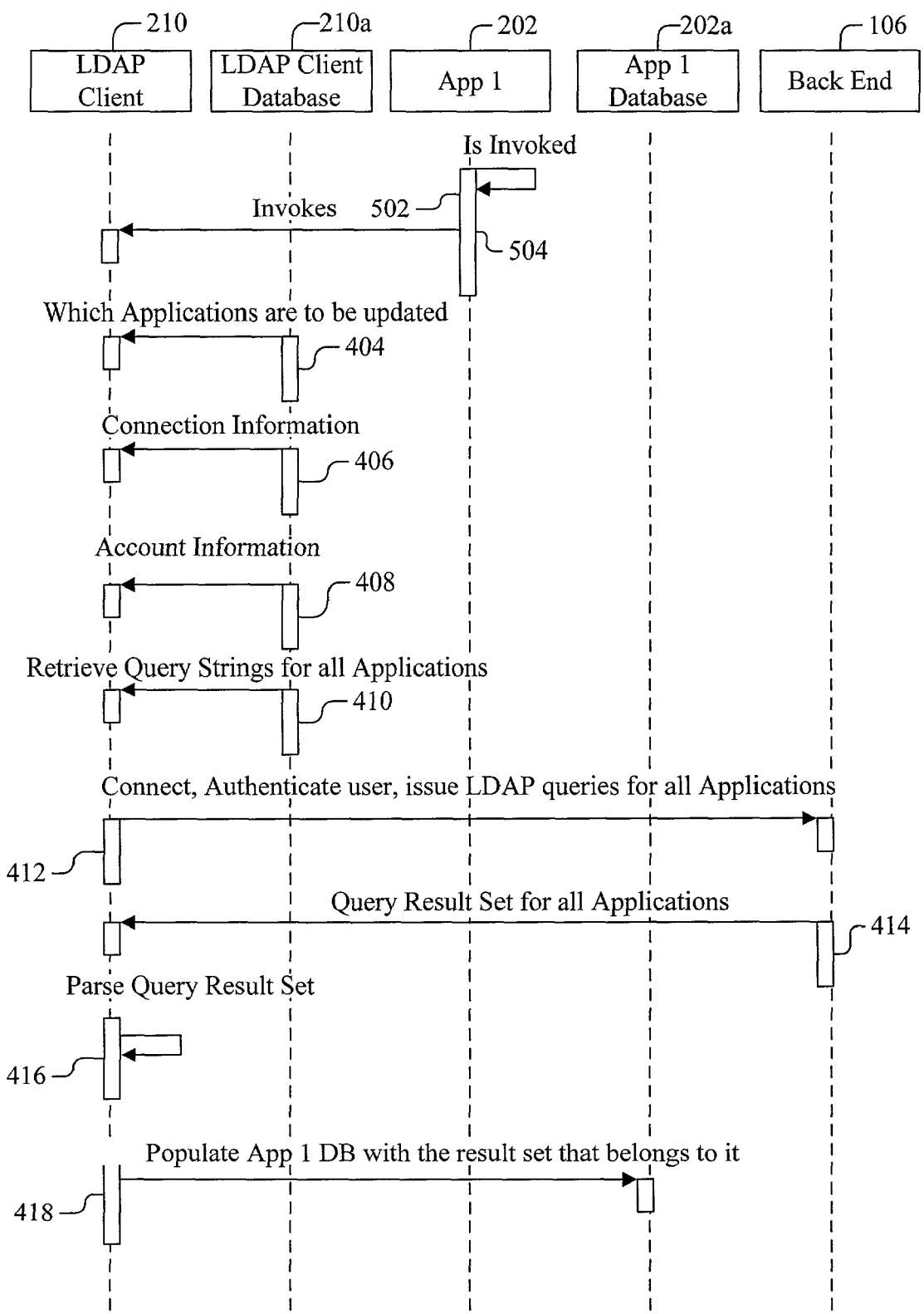
FIG. 5 is a sequence diagram illustrating an exemplary second use scenario of an application of the device of the system of FIG. 1.

In FIG. 1, the device 110 communicates with the back end server 106 using LDAP over, for example, TCP/IP via the communications network 108 to install and use applications, for example, as described with respect to FIGS. 3-5. The content server 102 and the corresponding database 102a may include any content source, such a Web Site, an electronic bulletin board, a digital library, a streaming or download video server, a streaming or download music server, etc.

The device 110 may include a digital networking or modem networking function (e.g., dial-up, DSL, cable, wireless, etc.) that may dial in to an assigned phone number list or log in to the back end server 106 with user validation (e.g., via a personal identification number (PIN), user name and password, etc.). Once a connection to the back end server 106 may be established, the LDAP protocol may be used between back end server 106 and a LDAP client of the device 110. If the modem or network may be in use and there is a TCP/IP connection available, the device 110 may use the TCP/IP connection to contact the back end server 106. The device 110 and may be implemented using the computer system 701 of FIG. 7, for example.

The back end server 106 communicates with the content server 102 using any suitable protocol, for example, TCP/IP via the communications network 104. The back end server 106 transfers the content from the content server 102, which then may be stored in the database 106a. The back end server 106 serves the content to the applications of the device 110 via the communications network 108. The back end server 106 includes all software and hardware, for example, to provide user account maintenance, to process validation and access control level (ACL) information, to provide a LDAP directory server where content and other information may be kept, etc.

The LDAP directory server that may be included in the back end server 106 may include an LDAP directory implemented via the database 106a. Generally, the LDAP directory may be a specialized database that may be read from or searched far more often than it may be written to, may include a flexible mechanism for keeping up with ongoing changes in the types of information that may be stored therein, may be highly distributed on a large scale, may be replicated (e.g., by hundreds or thousands of replicas) to provide high availability to the devices 110 accessing them, etc.

The user account maintenance and validation and ACL functionality performed by the back end server 106 may include: (i) storing account information for a new user on the database 106a; (ii) allowing a user to select the information that the user may want to subscribe to (e.g., sports scores, stock quotes, e-mail messaging, address look-up information, etc.); (iii) allowing a user to change their password; (iv) allowing an administrator of the back end server 106 to determine a level of access that a particular user has; (v) adding, deleting and modifying user information. Such tasks may be accomplished, for example, via a combination of off-the-shelf commercial software products and hardware devices and/or custom developed software products and hardware devices. For example, a web-based interface may be provided by the back end server 106 for the users to at their leisure add, remove modify subscribed services, change their password, etc.

Configurations of the system 100 and the back end server 106 are further described in the commonly owned co-pending United States Patent Application filed herewith, entitled "LIGHTWEIGHT DIRECTORY ACCESS PROTOCOL METHOD, SYSTEM AND COMPUTER PROGRAM PRODUCT," Ser. No. 10/115,254 and may be implemented using the computer system 701 of FIG. 7, for example.

It is to be understood that the system in FIG. 1 is for exemplary purposes only, as many variations of the specific hardware used to implement the present invention are possible, as will be appreciated by those skilled in the relevant art(s). For example, the functionality of the one or more of the systems 102-110 may be implemented via one or more programmed computers or devices. To implement such variations as well as other variations, a single computer (e.g., the computer system 701 of FIG. 7) may be programmed to perform the special purpose functions of, for example, the systems 102, 106 and/or 108 shown in FIG. 1. On the other hand, two or more programmed computers or devices, for example as in shown FIG. 7, may be substituted for any one of the systems 102-110. Principles and advantages of distributed processing, such as redundancy, replication, etc., may also be implemented as desired to increase the robustness and performance of the system 100, for example.

Accordingly, the systems 102-110 are any suitable servers, workstations, personal computers (PCs), PDAs, Internet appliances, cellular phones, palmtop computers, other devices, etc., capable of performing the processes of the present invention. The systems 102 and 106 may communicate with each other using any suitable protocol over communications network 104. The systems 106 and 110 may communicate with each other using the LDAP protocol over communications network 108. The systems 102-110 may be implemented using the computer system 701 of FIG. 7, for example.

The communications networks 104 and 108 may be implemented via one or more communications networks (e.g., the Internet, an Intranet, a wireless communications network, a satellite communications network, a cellular communications network, a hybrid network, etc.), as will be appreciated by those skilled in the relevant art(s). In a preferred embodiment of the present invention, the communications networks 104 and 108 preferably use electrical, electromagnetic, optical signals, etc., that carry digital data streams, as are further described with respect to FIG. 7.

Figure 2:
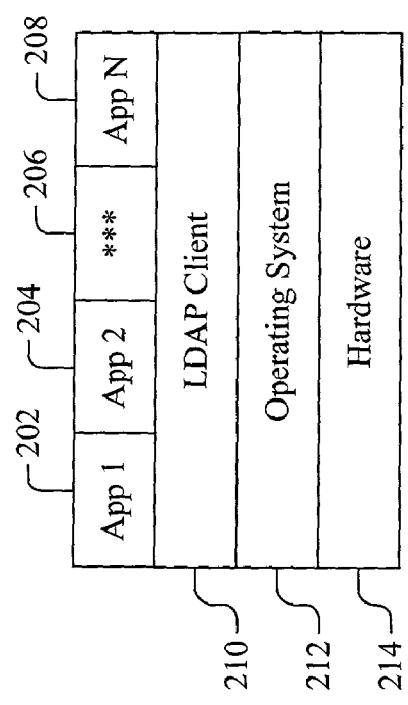
FIG. 2 is a block diagram illustrating a logical architecture of a LDAP device of the system of FIG. 1.

FIG. 2 is a block diagram illustrating a logical architecture of the LDAP device 110 of the system of FIG. 1, including a LDAP client 210, according to the present invention. In FIG. 2, the LDAP client 210 communicates with applications 202-208 and an operating system (OS) 212 of the device 110. The OS 212 communicates with hardware 214, which in turn communicates with the back end server 106 via the network 108. Accordingly, the LDAP client 210 may be able to gather or update information used by the applications 202-208 and service the applications 202-208 with the help of the OS 212 and the hardware 214. The LDAP client 210 serves as an intermediary between the applications 202-208 and the OS 212 and the hardware 214, and may be a conduit through which data may be transferred.

Thus, the LDAP client 210 may function as go between or intermediary between the applications 202-208 and the OS 212 and/or the hardware 214. The LDAP client 210 may handle communications with the OS 212 and the hardware 214, allowing programmers of the applications 202-208 to concentrate on the processing and presenting of data and interactions with the user of device 110.

Accordingly, the LDAP client 210 may service a plurality of processes corresponding to the applications 202-208 executing on the device 110. Each process may include a unit of activity characterized by a sequential thread of execution, a current state, and an associated set of device 110 resources. Generally, each process may occupy its own address space in a memory implemented in the hardware 214 of the device 110.

The arrangement of FIG. 2 also may be more efficient than an arrangement including multiple LDAP clients servicing respective applications. This is because by employing a single LDAP client 210, instead of employing multiple LDAP clients each performing the functions performed by the single LDAP client 210, code and duplication of tasks may be reduced.

The LDAP client 210 may interact with the back end server 106 via the hardware 214 and the network 108. The LDAP client 210 may be a software entity that, for example: (i) establishes a connection to the back end server 106 via the hardware 214; (ii) transmits a user identification (ID, e.g., a user name, password, etc.) to the back end server 106 for validation; (iii) recognizes all applications 202-208 that are present in the device 110; (iv) recognizes which of the applications 202-208 have information to be updated or refreshed; (v) issues LDAP queries on behalf of the applications 202-208; (vi) retrieves and parses a query result set received from the back end server 106 in response to an LDAP query from the device 110; (vii) populates appropriate databases implemented in a memory of the device 110 corresponding to the applications 202-208 with information received via the parsed query result set; (viii) services all present and future applications via, for example, a single instance of the LDAP client 210; and (ix) centralizes parameters of the user of the device 110 and customization parameters for the applications 202-208 and/or the device 110.

To illustrate the above-noted processes, the user of the device 10 may invoke or run one of the applications 202-208, for example, a movie listings application, etc. This may be one of many applications installed along with the LDAP client 210 on the device 110. The LDAP client 210 may include configuration parameters, such as a parameters indicating which applications are installed in the device 110, a parameters indicating which applications may have information (e.g., movie listings information, etc.) to updated in a database of the LDAP client 210 associated with the applications upon a next call or interaction with the back end server 106, etc.

The back end server 106 may include directory servers, firewalls, modem banks, etc. The back end server 106 also may include hardware and/or software for receiving a call from the device 110, for establishing a TCP/IP and LDAP connection with the device 110, for handling validation of the user of the device 110, for storing and transmitting information to the device 110, etc.

Each application 202-208 may include a GUI, which may include an update or refresh button, which may invoke the LDAP client 210 and may initiate updating of information (e.g., movie listings, etc.) for an application as well as any other applications that may be configured to be automatically updated whenever any application gets updated. Optionally, an icon may be provided in a main menu of the display 110a of the device 110 to provide such update or refresh functionality.

The back end server 106 may be continuously updating the database 106a with information that the devices 110 may employ. For example, the back end server 106 may query for movie listings for every zip code in the United States via the content server 102 and may store such information in the database 106a and supply such information to a movie listings application on the device 110. In a similar manner, all types of information (e.g., stock quotes, Heather report, sports scores, news, etc.) may be gathered and served by the back end server 106 to corresponding applications running on the device 110.

When a call comes in to, for example, modem banks of the back end server 106, the TCP/IP protocol then the LDAP may be established with the device 110 and information may be served by the back end server 106 to the device 110. The back end server 106 may be responsible for validating a user of the device 110 and ensuring that the user of the device 110 receives information that the user of the device 110 may be privileged to receive. The back end server also may be responsible for maintaining accounting and/or billing information of the user of the device 110.

The hardware 214 may include any hardware and/or device that may establish a connection with the back end server 106 via, for example, a modem, network card, wireless device, etc. The OS 212 may include any operating system that may operate the hardware 214 and enable the LDAP client 210 to establish the operation of the LDAP.

The applications 202-208 may include, for example, any software applications as describe in the commonly owned co-pending United States Patent Application filed herewith, entitled "METHOD, SYSTEM AND COMPUTER PROGRAM PRODUCT FOR LIGHTWEIGHT DIRECTORY ACCESS PROTOCOL APPLICATIONS," Ser. No. 10/115, 258, third party applications, open source applications, freeware applications, shareware applications, etc. The applications 202-208 may utilize, for example, an application program interface (API) as describe in the commonly owned co-pending United States Patent Application filed herewith, entitled "METHOD, SYSTEM AND COMPUTER PROGRAM PRODUCT FOR A LIGHTWEIGHT DIRECTORY ACCESS PROTOCOL CLIENT APPLICATION PROGRAM INTERFACE," Ser. No. 10/115,255, any API designed to interact with the LDAP client 210, etc. The applications 202-208 may be responsible for interacting with a user of the device 110 and managing data related to the user and/or the device 110.

FIG. 3 is a sequence diagram illustrating an exemplary installation scenario for the applications 202-208 on the device 110 of the system of FIG. 1, according to the present invention. In FIG. 3, processing may begin at step 302, wherein the OS 212 via the hardware 214 may install the LDAP client 210.

The installation of the LDAP client 210 and/or the applications 202-208 on the device 110, may be performed by a combination of software and hardware. For example, a desktop application running on a PC of the user of the device 110 may be provided and which may include various PC applications, such a calendar with appointments application, a phone book application, etc.

The information from the desktop application may be synchronized with the corresponding information in the device 110 via a hardware device, such as a cradle, etc., that the device 110 sits in and that is connected to the PC (e.g., via a cable to an RS232 port, communications port, USB port, etc.) of the user of the device 110. The OS 212 via the hardware 214 of the device 110 may then communicate with the PC of the user of the device 110 via the cradle, etc. Accordingly, a record may be updated or deleted on the device 110 and a next time synchronization occurs, the information from the device 110 may be updated in the corresponding desktop application on the PC and visa versa.

The desktop application also may include an installation dialog, whereby application files (e.g., downloaded over the Internet, etc.), such as the applications 202-208, etc., for the device 110 stored on a hard drive of the PC may be selected to be downloaded and/or installed on to the device 110. Such application files may include programs and/or databases that may be in a format that may be proprietary to the device 110. At a next synchronization such application files may be downloaded and/or installed on the device 110.

At step 304, a database 210a including configuration parameters for the LDAP client 210 may be installed or created in the hardware 214 by, for example, the OS 212. At steps 306 and 308, the LDAP client 210 may install the applications 202 and 204. At step 310, the LDAP client 210 may add user account-related information to the database 210a. At step 312, the LDAP client 210 may add connection-related information to the database 210a. At step 314, the application 202 may add application-related information to the database 210a. At step 316, the application 204 may add application-related information to the database 210a, completing the exemplary installation scenario. Accordingly, via the above processes, the LDAP client 210 may be installed and in turn may install one or more of the applications 202-208 and store information for the applications 202-208 in the databases 210.

The user account-related information may include information about the user of the device 110 that may allow the back end server 106 to determine if the user of the device 110 has access to the back end server 106, what level of access the user of the device 110 may have, etc., for billing and other purposes. The connection-related information may include information that allows the LDAP client 210 to connect to the back end server 106 (e.g., a telephone number to dial, a TCP/IP address of a directory server of the back end server 106 to connect to, etc.). The application-related information may include information that the LDAP client 210 may need to know about each of the application 202-208 that may installed on the device 110, such as query strings for the applications 202-208, flags (e.g., set to true or false, etc.) that may indicate if the information related to the applications 202-208 may be returned by the back end server 106 to the LDAP client 210, etc.

FIG. 4 is a sequence diagram illustrating an exemplary first use scenario of the application 202 of the device 110 of the system of FIG. 1, according to the present invention. In FIG. 4, processing begins at step 402, wherein the OS 212 invokes the LDAP client 210. The LDAP client 210 may be invoked in a number of different ways. For example, a user of the device 110 may select an application of the applications 202-208, which in turn invokes the LDAP client 210, the OS 212 may include a trigger, such as a timer, that invokes the LDAP client 210, the user of the device 110 may select the LDAP client 210 itself, etc.

The applications 202-208 also may be invoked by the user of the device 110 tapping on an icon for one of the applications 202-208 using, for example, a stylus (e.g., a device shaped like pen, etc.). Such tapping may be detected by the OS 212, which launches the corresponding application. The launched application may include a refresh button, which when tapped may launch the LDAP client 210. The timer also may be employed to allow events, such as invoking one of the applications 202-208, the LDAP client 210, etc., to occur periodically.

At step 404, applications to be updated, for example, the application 202, may be determined from the application-related information (e.g., flags, parameters, etc.) stored in the database 210*a* of the LDAP client 210. At step 406, the LDAP client 210 may gather the connection-related information (e.g., a telephone number to dial, a TCP/IP address of a directory server of the back end server 106 to connect to, etc.) for the application 202 from the database 210*a*. At step 408, the LDAP client 210 may gather the account-related information (e.g., user identification, access level, billing information, etc.) for the application 202 from the database 210*a*. At step 410, the LDAP client 210 may gather the query strings for all the applications 202-208 from the application-related information stored in the database 210*a*.

At step 412, the LDAP client 210, via the connection-related information for the applications 202-208 gathered from the database 210*a*, the hardware 214, and the communications network 108, may establish a connection with the back end server 106. The back-end server 106 may authenticate a user of the device 110 via the account related information for the applications 202-208 gathered from the database 210*a*. The LDAP client 210 may transmit the query strings for the applications 202-208, gathered from the application-related in the database 210*a*, to the back end server 106. The authentication in step 412 may occur at the back end server 106 in a variety ways. For example, the LDAP may include provisions for user authentication and/or at a time of establishing a TCP/IP protocol there may be employed other levels of or means for authentication.

At step 414, the back end server 106, via the communications network 108 and the hardware 214, may transmit a query result set for the applications 202-208 to the LDAP client 210. At step 416, the LDAP client 210 may parse the query result set. At step 418, the LDAP client 210 may populate a database 202*a* (e.g., created or installed in the hardware 214 by the LDAP client 210, etc.) corresponding to the application 202 with the result set belonging to the application 202, completing the exemplary first use scenario. Via the above processes, the LDAP client 210 may be invoked to run and update one or more of the applications 202-208.

In the above scenario, the back end server 106 may receive a call from the device 110 via, for example, a modem bank over the communications network 108. The back end server 106 may answer the call from the device 110. The device 110 and the back end server 106 may establish a TCP/IP connection over the communications network 108. The back end server 106 may authenticate the account-related information received from the device 110 over the communications network 108, for example, via software at the back end server 106.

A directory server implemented at the back end server 106 may receive the query strings for the applications 202-208 from the device 110 over the communications network 108. The back end server 106 may return the query result sets corresponding to the query strings received from the device 110 to the LDAP client 210 of the device 110 over the communications network 108.

Query result sets corresponding to the applications 202-208 may be returned by the back end server 106 to the LDAP client 210 in response to receiving the query strings the applications 202-208 in the LDAP format. A query result set received from the back end server 106 by the LDAP client 210, may be parsed by the LDAP client 210 using, for example, API function calls. The LDAP client 210 may know, via flags from the application-related information stored in the database 210 for the applications 202-208, which databases may be populated or which databases may have records thereof updated.

The back end server 106 may include custom software and mechanisms to obtain content from the content server 102. For example, with respect to providing a movie listings application, a format for delivery of movie listings information from the content server 102 to the back end server 106 may be determined and such information may be stored in the database 106*a* for use by directory servers of the back end server 106. The back end server 106 also may automatically gather information from the content server 102 using, for example, search engines, bots, parsing techniques, etc.

FIG. 5 is a sequence diagram illustrating an exemplary second use scenario of the application 202 of the device 110 of the system of FIG. 1, according to the present invention. In FIG. 5, processing may begin at step 502, wherein the application 202 may be invoked, as described previously, in turn invoking the LDAP client 210 at step 504. Steps 404-418 complete the exemplary installation scenario. Steps 404-418 may be performed in similar manner as described with respect to steps 404-418 of FIG. 4.

Figure 6:
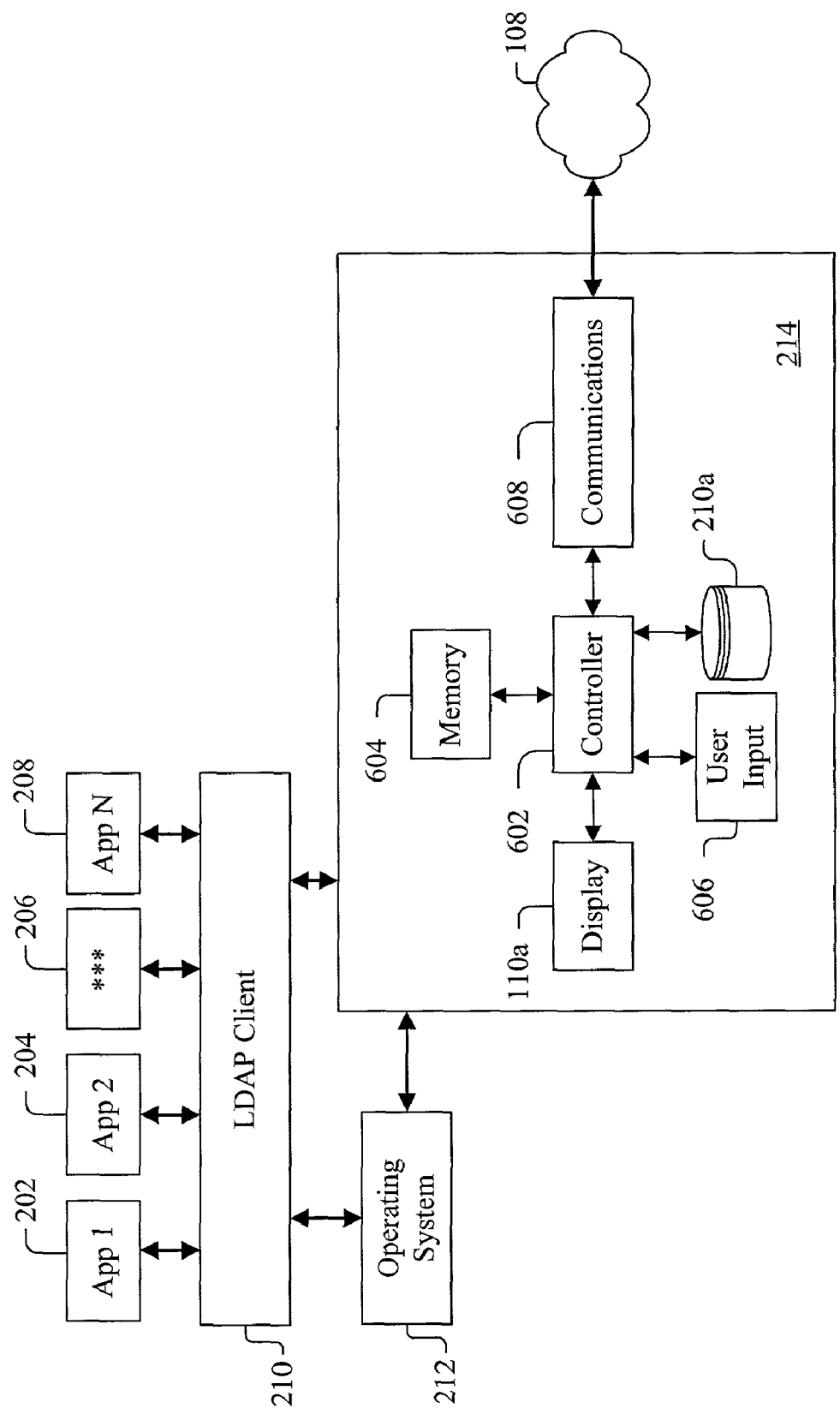
FIG. 6 is a block diagram further illustrating the LDAP client device of FIG. 2.

FIG. 6 is a block diagram further illustrating the device 110 of FIG. 2, including further component of the hardware 214, such as the database 210*a* of the LDAP client 210, the display device 110*a*, a controller 602, a memory device 604, a user input device 606, and a communications device 608. The communications device 608 may communicate with the back end server 106 via the network 108.

The communications device 608 may any communications device that may establish a connection with the back end server 106, for example, including a modem, network card, etc. The controller 602 may include any controller, for example, including one or more micro-controllers, microprocessors, general-purpose processors, digital signal processors, etc. The user input device may include any input device, for example, including, a stylus input device, a mouse input device, a voice input device, a touch screen input device, etc. The display device 110a may include any display device, for example, including a liquid crystal display (LCD), etc. The memory device 604 may include any memory device, for example, including any of the memory devices listed with respect to FIG. 7.

In a preferred embodiment, the applications 202-208, the LDAP client 210, and/or the OS 212 may be implemented in a portion of the memory device 604. However, the device 110 may include a hard disk device, in which case the applications 202-208, the LDAP client 210, and/or the OS 212 may be implemented in a portion of the hard disk device. Accordingly, the applications 202-208, the LDAP client 210, the OS 212 and the hardware 214, including components 602-608, 110a and 210a, may include any combination of software, firmware and/or hardware capable of performing the processes as described with respect to FIGS. 3-5 and may be implemented, for example, via the computer system of FIG. 7.

The LDAP client-based device 110 according to the present invention, in terms of functional capabilities, may be between that of a pager and a personal computer (PC), such as a laptop PC. The LDAP client-based device 110 according to the present invention may be closer to a PC, in that it has an operating system, it may run applications (i.e., programs). Such programs may be written by any programmer who knows a suitable programming language (e.g., C, C++, Java, J2ME, etc.). The variety of applications that may be run on the LDAP client-based device 110 according to the present invention may be comparable to those found for a PC. The user may input data, have the program process the data and then retrieve the data, as may be the case with a spreadsheet application.

The LDAP client-based device 110 according to the present invention may not be as powerful or feature-rich as a typical PC, in that the display area may not be as large and the device 110 may have limited memory and processor resources. The input to the LDAP client-based device 110 may be by comparison somewhat cumbersome, since no mouse or keyboard may be typically provided. The graphics typically may not be as good as on a PC. However, the LDAP client-based device 110 may fit in a pocket of a user, may transfer data to and from a PC, and the number of applications may grow exponentially.

The present invention may be useful to, for example, all owners of hand-held devices, such as Palm Pilots, Handspring devices, cell phones, etc., and perhaps even useful for laptop computer owners. Some of the services a user may subscribe to, for example, may include: (i) Stock quotes: the symbol and the current value are displayed—however, many aspects of such a service may be customized, such as: the symbol list, symbol lookup, information refresh rate, etc.; (ii) Portfolio quote: a summary report for the user's stock portfolio as provided by the user's stockbroker; (iii) E-mail: instead of pulling all of the information across, just pull down the headers (i.e., subjects), if a message is selected to be read then the message body may be retrieved; (iv) Phone number lookup: nation wide, directory lookup without advertisements; (v) E-mail address lookup; (vi) Search engines; (vii) Web-based meeting scheduler. The device 110 may include a calendar and a To-Do list. For instance, the user may access a Web page, set a time for a meeting, then when the device 110 dials up, the meeting may be added to the user's calendar. A similar scenario applies for the To-Do items. Another type of service may be (viii) Other publish and subscribe services.

Similarly, stock quote providing services, stockbrokers, etc., may benefit from the present invention. In this scenario, such entities may pay the LDAP service provider (e.g., the owner of the back end server 106 of FIG. 1) for providing the noted services to their customers on their behalf. Similarly, e-mail providers may benefit from the present invention by paying, for example, the LDAP service provider to allow their clients to download their e-mail and software on to the devices 110 via the LDAP service provider's infrastructure.

In the same way, banks may provide account information to their customers via the LDAP service provider's infrastructure. Similarly, credit card companies may provide account information to their customers via the LDAP service provider's infrastructure.

Search engines may pay the LDAP service provider to provide customers with access to their databases via the LDAP service provider's infrastructure. Otherwise, such service could be given to customers of an Internet service provider (ISP) as a value-added feature.

Directory look up providers local phone service providers, Internet phone book service providers would benefit from the present invention. In this same way, map providers, may pay the LDAP service provider to allow their customers to download a map (e.g., text, graphics, etc.) via wireless modem for display on the device 110.

All of the above-noted services would allow the user to customize certain basic parameters, for example, including: (i) amount of information coming back at one time, (ii) presentation mode, (iii) information refresh rate, (iv) the device 110 buffer size, (v) the integration of various applications (e.g., so that with one call all applications are updated). The suite of applications may be extended as time goes on.

In the above respect, the hand-held service market may be practically untapped. The hand-held applications market may be one of the fastest growing out there and there are literally millions of hand-held device users in this market. Owners of hand-held devices are always looking for new applications or services to run on their hand-held devices. Internet companies are noticing and thinking of services to provide customers with hand-held devices. According to the present invention, initial and subsequent services may be targeted for either the owners of hand-held devices directly or for companies that want to provide their customers with information or access to their information via a hand-held device.

The present invention stores information relating to various processes described herein. This information may be stored in one or more memories, such as a hard disk, optical disk, magneto-optical disk, RAM, etc. One or more databases, such as the databases 102a, 106a, 202a, 210a, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 7, for example.

The previously described processes include appropriate data structures for storing data collected and/or generated by the processes of the system 100 of FIG. 1 in one or more databases thereof. Such data structures accordingly will includes fields for storing such collected and/or generated data. In a database management system, data may be stored in one or more data containers, each container contains records, and the data within each record may be organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms table, row, and column may be used herein to refer respectively to the data container, record, and field.

All or a portion of the invention (e.g., as described with respect to FIGS. 1-6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer art. Appropriate software may be readily prepared by programmers of ordinary skill based on the teachings of the present disclosure, as will be appreciated by those skilled in the software art. In addition, the present invention (e.g., as described with respect to FIGS. 1-6) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 7).

Figure 7:
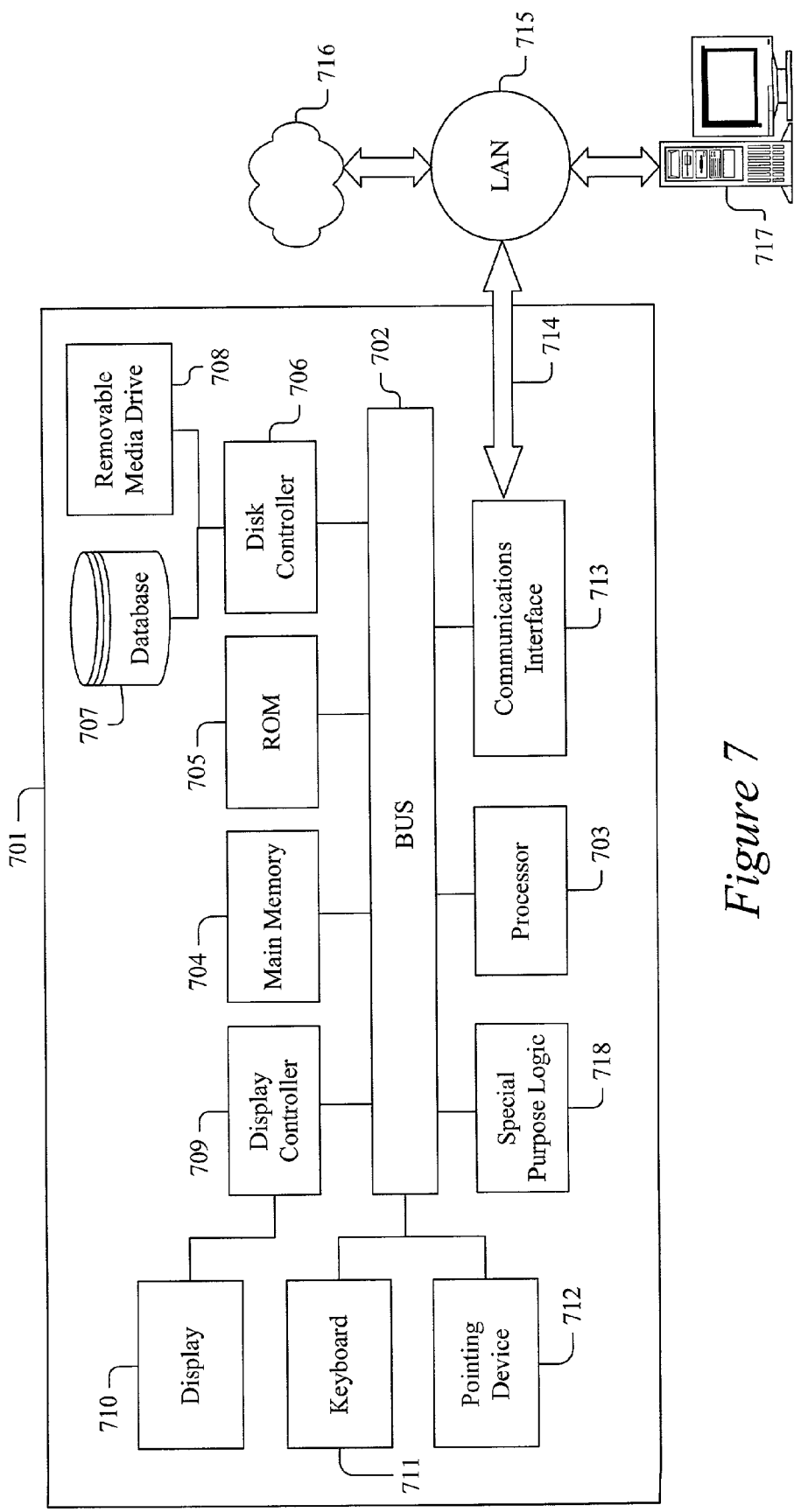
FIG. 7 is an exemplary computer system, which may be programmed to perform one or more of the processes of the present invention.

FIG. 7 illustrates a computer system 701 upon which the present invention (e.g., systems 102, 106, 110, etc.) may be implemented. The present invention may be implemented on a single such computer system, or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 may also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the system shown in FIGS. 1-6, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

Stored on any one or on a combination of computer readable media, the present invention includes software for controlling the computer system 701, for driving a device or devices for implementing the invention, and for enabling the computer system 701 to interact with a human user (e.g., a user of the systems 102, 106, 110, etc.). Such software may include, but may not be limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java, J2ME, etc.) classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that may be connected to, for example, a local area network (LAN) 715, or to another communications network 716 such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links may also be implemented. In any such implementation, communication interface 713 sends and receives electrical, electromagnetic, or optical signals that carry digital data streams representing various types of information. Further, the communication interface 713 may include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the Internet) or to data equipment operated by service provider. The local network 715 and network 716 both use electrical, electromagnetic, or optical signals to convey information and instructions. The signals through the various networks and the signals on network link 714 and through communication interface 713, which communicate digital data with computer system 701, are exemplary forms of carrier waves bearing the information and instructions.

The computer system 701 may send messages and receive data, including program code, through the network(s), network link 714, and communication interface 713. In the Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708, or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term computer readable medium as used herein may refer to either transitory medium or non-transitory computer readable storage medium for participating in providing instructions to the processor 703 for execution. Such non-transitory computer storage medium may take many forms, including but not limited to, non-volatile media, and volatile media. Transitory medium can include transmission media. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media may also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer may read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a PDA, a laptop, an Internet appliance, a cellular phone, a palmtop computer, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Although the present invention may be described in terms of applications in hand-held devices, such as PDAs, palmtop computers, cell phones, Internet appliances, etc., the present invention is applicable to other devices, such as laptop computers, etc., where memory and processing resources are at a premium, as will be appreciated by those skilled in the relevant art(s).

While the present invention has been described in connection with a number of embodiments and implementations, the present invention is not so limited but rather covers various modifications and equivalent arrangements, which fall within the purview of the appended claims.

What is claimed is:

1. A method for managing a hand-held device executing a plurality of applications, comprising:
   invoking a client installed on the hand-held device for communicating with a directory server in accordance with a lightweight directory access protocol (LDAP);
   identifying multiple applications from among the plurality of applications executing on the hand-held device, said multiple applications having information content to be updated;
   sending a lightweight directory access protocol (LDAP) query from the client to the directory server, the query identifying the information content;
   receiving a query result from the directory server, the query result including updated information content for the multiple applications;
   storing the updated information content via the client; and
   parsing the query result via the client to extract the updated information content for each of the multiple applications.

2. The method of claim 1, wherein the query result comprises a lightweight directory access protocol (LDAP) query result.

3. The method of claim 1, wherein the directory server stores updated information content in a lightweight directory access protocol (LDAP) directory.

4. The method of claim 1, wherein the hand-held device includes a personal digital assistant (PDA), an Internet appliance, a cellular phone, or a palmtop computer.

5. The method of claim 1, further comprising:
populating memory of the hand-held device corresponding to the applications via a parsed query set.

6. The method of claim 1, further comprising:
concurrently executing each of the applications in a respective process.

7. A non-transitory computer-readable storage medium bearing instructions for managing a hand-held device executing a plurality of applications, the instructions arranged, upon execution, to cause one or more processors, to perform the steps of:
invoking a client installed on the hand-held device for communicating with a directory server in accordance with a lightweight directory access protocol (LDAP);
identifying multiple applications from among the plurality of applications executing on the hand-held device, said multiple applications having information content to be updated;
sending a lightweight directory access protocol (LDAP) query from the client to the directory server, the query identifying the information content;
receiving a query result from the directory server, the query result including updated information content for the multiple applications;
storing the updated information content via the client; and
parsing the query result via the client to extract the updated information content for each of the multiple applications.

8. The non-transitory computer-readable storage medium of claim 7, wherein the query result comprises a lightweight directory access protocol (LDAP) query result.

9. The non-transitory computer-readable storage medium of claim 7, wherein the directory server stores updated information content in a lightweight directory access protocol (LDAP) directory.

10. The non-transitory computer-readable storage medium of claim 7, wherein the hand-held device includes a personal digital assistant (PDA), an Internet appliance, a cellular phone, or a palmtop computer.

11. The non-transitory computer-readable storage medium of claim 7, further arranged to perform the steps of:
populating memory of the hand-held device corresponding to the applications via a parsed query set.

12. The non-transitory computer-readable storage medium of claim 7, further arranged to perform the steps of:
concurrently executing each of the applications in a respective process.

13. A hand-held device, comprising:
a processor configured to perform the steps of,
execute a plurality of applications;
invoke a client installed on the hand-held device for communicating with a directory server in accordance with a lightweight directory access protocol (LDAP);
identify multiple applications from among the plurality of applications executing on the hand-held device, said multiple applications having information content to be updated;
send a lightweight directory access protocol (LDAP) query from the client to the directory server, the query identifying the information content;
receive a query result from the directory server, the query result including updated information content for the multiple applications; and
a memory configured to store the updated information content via the client, and
wherein the processor is further configured to parse the query result via the client to extract the updated information content for each of the multiple applications.

14. The hand-held device of claim 13, wherein the query result comprises a lightweight directory access protocol (LDAP) query result.

15. The hand-held device of claim 13, wherein the directory server stores updated information content in a lightweight directory access protocol (LDAP) directory.

16. The hand-held device of claim 13, wherein the hand-held device includes a personal digital assistant (PDA), an Internet appliance, a cellular phone, or a palmtop computer.

17. The hand-held device of claim 13, further comprising:
means for populating memory of the hand-held device corresponding to the applications via a parsed query set.

18. The hand-held device of claim 13, further comprising:
means for concurrently executing each of the applications in a respective process.

19. A method for managing a hand-held device executing a plurality of applications that display information content in accordance with respective subscription services, comprising:
invoking a client installed on the hand-held device for communicating with a directory server in accordance with a lightweight directory access protocol (LDAP);
identifying at least some of the applications executing on the hand-held device having information content to be updated in accordance with the respective subscription services;
sending a single lightweight directory access protocol (LDAP) query from the client to the directory server, the query identifying the information content to be updated in accordance with the respective subscription services;
receiving a query result from the directory server, the query result including updated information content for the at least some of the applications in accordance with the respective subscription services;
storing the updated information content via the client;
parsing the query result via the client to extract the updated information content for each of the at least some of the applications; and
each of said at least some of the applications displaying the updated information content in accordance with the respective subscription services.

20. A non-transitory computer-readable storage medium bearing instructions for managing a hand-held device executing a plurality of applications that display information content in accordance with respective subscription services, the instructions arranged, upon execution, to cause one or more processors, to perform the steps of:
invoking a client installed on the hand-held device for communicating with a directory server in accordance with a lightweight directory access protocol (LDAP);
identifying at least some of the applications executing on the hand-held device having information content to be updated in accordance with the respective subscription services;
sending a single lightweight directory access protocol (LDAP) query from the client to the directory server, the query identifying the information content to be updated in accordance with the respective subscription services;

receiving a query result from the directory server, the query result including updated information content for the at least some of the applications in accordance with the respective subscription services;

storing the updated information content via the client;

parsing the query result via the client to extract the updated information content for each of the at least some of the applications; and each of said at least some of the applications displaying the updated information content in accordance with the respective subscription services.

21. A hand-held device, comprising:

a processor configured to, execute a plurality of applications on the hand-held device that display information content in accordance with respective subscription services;

invoke a client installed in the hand-held device for communicating with a directory server in accordance with a lightweight directory access protocol (LDAP);

identify at least some of the applications on the hand-held device having information content to be updated in accordance with the respective subscription services;

send a single lightweight directory access protocol (LDAP) query from the client to the directory server, the query identifying the information content to be updated in accordance with the respective subscription services;

receive a query result from the directory server, the query result including updated information content for the at least some of the applications in accordance with the respective subscription services; and a memory configured to store the updated information content via the client, wherein the processor is further configured to parse the query result via the client to extract the updated information content for each of the at least some of the applications, and to cause each of said at least some of the applications to display the updated information content to the hand-held device in accordance with the respective subscription services.

* * * * *